Fig. 2

Patented June 6, 1944

2,350,587

UNITED STATES PATENT OFFICE 2,350,587

AGRICULTURAL MACHINE

Walter G. Charley, La Crescent, Minn., and August G. Buhr, La Crosse, Wis., assignors to Allis-Chalmers Manufacturing Company, Milwaukee, Wis., a corporation of Delaware Application August 15, 1941, Serial No. 407,032

16 Claims. (Cl. 97—50)

The invention relates to agricultural machines having a ground engaging tool or a plurality of ground engaging tools which are mounted on the machine frame for up and down movement relative to the ground. In machines of this character, the line of draft on which propelling force is transmitted from the machine frame to the tool in its operative position usually extends at an angle relative to the horizontal. It is also usual to place the point of draft on the machine frame ahead of the tool or tools, in which case the tool becomes subject to a vertical component of the draft force, which tends to lift the tool out of the ground. The vertical component of the draft force is counteracted by the weight of the tool and its support which is movable up and down relative to the machine frame, and in the case of a cultivator or other machine having a suction producing tool, or a plurality of suction producing tools, the vertical component of the draft force is counteracted by the gravitational and suction forces acting upon the tool or implement unit.

As the machine advances with the tool or tools adjusted to a working position the tool or tools encounter varying conditions of soil reaction, for instance by running into hard or soft spots in the ground or into local rises and hollows of the ground, and the draft force accordingly increases and decreases. A certain soil reaction, however, may be assumed to be prevalent as a normal working condition.

It is an object of the invention to provide an improved machine of the mentioned character, in which the vertical component of the draft force, under normal working conditions, is overbalanced by the gravitational and suction forces acting upon an up and down adjustable tool or implement unit. The advantage to be accomplished by this provision is that no spring pressure is required to hold the tool or implement unit in its operating position under normal working conditions, and the improved machine, as contemplated by the invention, is further so constructed that the desired result is obtained without incorporating unusual weight in the tool or implement unit.

Another object of the invention is to provide an improved machine of the mentioned character in which the vertical component of the draft force is overbalanced by the combined gravitational and suction forces under normal working conditions, and in which provisions are made to restrain the tool or implement unit from jumping out of the ground if the tools run into hard ground or into a rise of the ground, and the vertical component of the draft force becomes strong enough to overbalance the gravitational and suction forces acting upon the tool or implement unit.

Another object of the invention is to provide a mechanism affording the mentioned restraint upon the tool or implement unit without reliance upon two-way actuating mechanism for raising and lowering the tool or implement unit, so that a simple and inexpensive one-way actuating mechanism may be used to raise the tool or implement unit from its operative to its inoperative position, and the tool or implement unit may be permitted to move into its operating position by its own weight, and under the action of the suction forces if suction producing tools are used.

These and other objects and advantages of the invention will be more fully apparent from the following description of a preferred embodiment of the invention shown in the accompanying drawings. Referring to the drawings in which like reference characters designate the same or similar parts in the various views.

The tractor shown in the drawings is a tricycle type tractor having widely spaced rear wheels 1 and 2 and a pair of closely spaced front wheels 3 and 4 centrally ahead of the rear wheels 1 and 2. An upwardly arched rear axle structure on which the rear wheels are mounted comprises a central gear casing 6 and side arms 7 and 8 having outer housing portions 7' and 8' depending at the outer ends of the side arms and enclosing final drive gears for the rear wheels 1 and 2. Secured to the gear casing 6 at the forward side of the rear axle structure is a torque tube casing 9, which has an elongated relatively narrow portion extending longitudinally of the tractor and terminating at the forward end of the torque tube casing in a rearwardly tapering bell housing having mounting pads 11 at opposite sides of the tractor. An internal combustion engine 12 is rigidly secured to the torque tube casing 9, at the forward end of the bell housing, and a bracket 13 secured to the forward end of the engine 12 is supportingly connected with a pedestal 14 on which the front wheels 3 and 4 are mounted. An operator's seat at the rear of the tractor comprises a seat cushion 16 supported by longitudinal frame bars 17 and 18 secured intermediate their ends to the side arms 7 and 8 of the rear axle structure and connected together at their forward ends by a cross-bar 19 mounted on and extending transversely of the torque tube casing 9. The operator's seat also includes a backrest 21 which is supported on the support for the seat cushion at a suitable distance above the seat cushion. A steering wheel 22 within reach of an operator seated on the cushion 16 is operatively connected with the front wheels 3 and 4 by a steering mechanism including a reach rod 23 at the left side of the tractor. The reach rod is arranged in an elevated position relative to the mounting pad 11 at the left side of the tractor and relative to the bracket 13 so as to leave an unobstructed space for mounting an implement attachment on the tractor below the reach rod.

Figure 2:
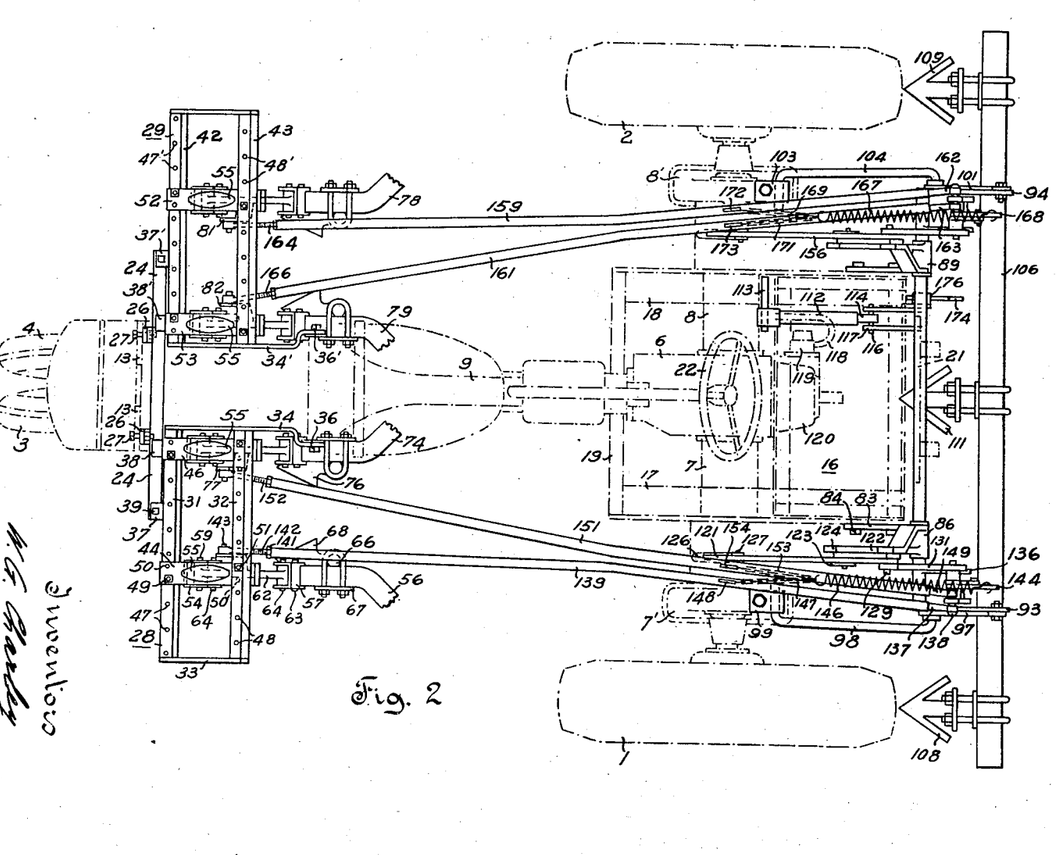
Fig. 2 is a top view of the machine shown in Fig. 1.

Referring to Fig. 2, a square cross-bar 24 extends transversely of the tractor below the engine 12 and is rigidly secured to the bracket 13 by a pair of hangers 26, the hangers being detachably secured to the bracket 13 by bolts 27. The cross-bar 24 serves as a forward support for a pair of draft frames 28 and 29 at opposite sides of the tractor. The draft frame 28 comprises a pair of square tubular draft bars 31 and 32, one rearwardly of and above the other, and which are rigidly connected at their outer ends by a plate member 33 and at their inner ends by a strap 34 which has a bent rearward extension bolted to the mounting pad 11 at the left side of the tractor at 36. Secured to the forward draft bar 31 are an angle clip 37 and a U-clip 38, the angle clip 37 having an upper leg overlying the cross-bar 24, and a bolt 39 extends through the upper leg of the clip 37 and is screwed into a tapped hole at the outer end of the cross-bar 24 to rigidly secure the clip 37 to the cross-bar 24. The U-clip 38 is open at its forward end, and its legs are spaced to provide a close fit on the cross-bar 24 at the top and bottom sides of the latter.

The draft frame 29 at the right side of the tractor is constructed and arranged in the same manner as has just been described in connection with the draft frame 28, that is, the draft frame 29 comprises a pair of square tubular draft bars 42, 43, as shown in Fig. 2, which correspond to the draft bars 31 and 32, and which extend transversely of the tractor, one rearwardly of and above the other. An angle clip 37' corresponding to the angle clip 37, and a U-clip 38', corresponding to the U-clip 38, connect the draft frame 29 to the cross-bar 24 at the right side of the tractor, and a strap 34', corresponding to the strap 34, is bolted to the mounting pad 11 at the right side of the tractor at 36'.

A pair of plate members 44, 46 extend between the draft bars 31 and 32 of the draft frame 28, each plate member having a flat rearward portion underlying the draft bar 32 and a flat forward portion overlying the draft bar 31. A hole in the forward portion of the plate member 44 registers with one of a series of holes 47 in the draft bar 31, and another hole in the rearward portion of the plate member 44 registers with one of a series of holes 48 in the draft bar 32. The plate member 44 is secured to the draft bar 31 by a screw bolt 49 extending through the mentioned forward hole of the plate member and the registering hole in the draft bar 31, and another bolt 51 extends through the hole in the rearward portion of the plate member 44 and through the registering hole in the draft bar 32 to secure the plate member 44 in fixed position on the draft frame 28.

The second plate member 46 on the draft frame 28 is mounted in the same manner as has just been described in connection with the plate member 44, and a pair of bolts corresponding to the bolts 49 and 51 secure the plate member 46 to the draft bars 31 and 32.

Another pair of plate members 52, 53 are adjustably mounted on the draft frame 29 in the manner explained hereinbefore in connection with the plate members 44, 46 of the draft frame 28, the draft bars 42 and 43 having longitudinal series of holes 47' and 48', respectively.

Figures 1, 5:
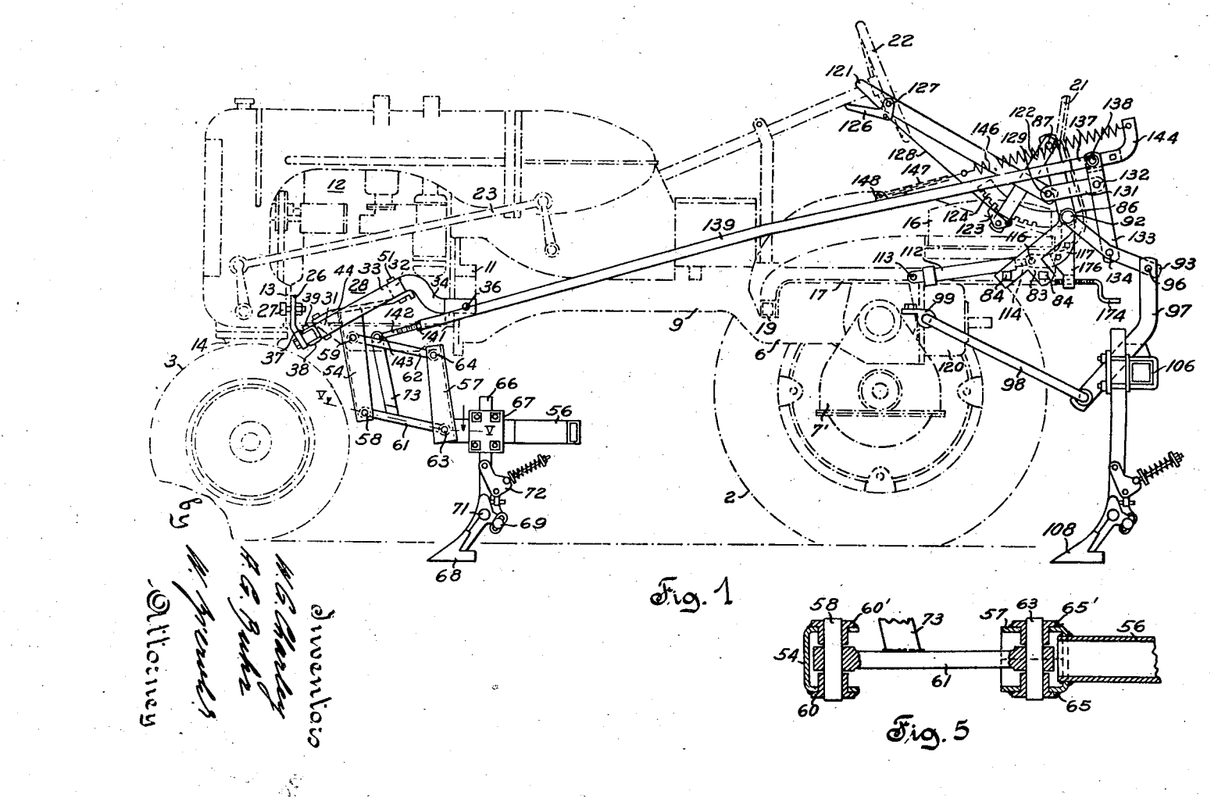
Fig. 1 is a side view of a tractor and cultivator mounted thereon, showing the cultivator adjusted to an operative position, the near rear wheel of the tractor being omitted to expose rear connections of the cultivator with the tractor.
Fig. 5 is an enlarged section on line V—V of Fig. 1.

Referring to Fig. 2, each of the plate members 46, 44, and 53, 52 has an oblong elevated portion 55 which is formed by pressing the plate members in a set of dies for the purpose of increasing the bending strength of the plate members. A bracket 54 is secured to the plate member 44, as shown in Fig. 1, in a depending position forwardly of the elevated rear end of the draft frame 28, preferably by welding. The bracket 54 is formed by bending a plate metal blank into U-shape, as shown in Fig. 5, to provide a pair of side flanges which are spaced from each other transversely of the tractor and are connected by a web portion at the forward side of the bracket 54. The plate member 46 has a depending bracket similar to the bracket 54 between the forward and rearward draft bars 31, 32, and each of the plate members 52, 53, also has a depending bracket, corresponding to the bracket 54, between the draft bars 42, 43.

Referring to Fig. 1, a tool support comprises a rig beam 56 and a bracket 57 secured to the forward end of the rig beam 56 in an upstanding position, preferably by welding. The bracket 57 is formed, like the bracket 54, by bending a plate metal blank into U-shape to provide a pair of side flanges which are spaced transversely of the tractor and connected by a web at the rear side of the bracket 57.

Referring to Fig. 5, a pair of hardened steel bushings 60 and 60' are mounted in a pair of substantially alined holes in the side flanges of the bracket 54 at the lower end of the latter, the bushings having annular shoulders bearing against the outer sides of the bracket and being securely held in place, preferably by fillet welds between the shoulders and side flanges of the bracket. A lower draft link 61 is mounted between the side flanges of the bracket 54 by means of a hardened steel pin 58 which is journaled in the bushings 60 and 60' and has a close running fit therein. The link 61 is made from a blank of round bar stock by upsetting the ends of the blank to form an eye on each end of the link, the pin 58 being press-fitted into the eye at the forward end of the link, and the eye being of such thickness as to fit closely but freely between the relatively opposed end faces of the bushings 60 and 60'.

Another pair of hardened steel bushings 65 and 65' are mounted in substantially alined holes of the side flanges, of the bracket 57 near the lower end of the latter, the bushings 65 and 65' being exact duplicates of the bushings 60 and 60' and secured to the bracket 57 in the same manner as has been described hereinbefore in connection with the bushings 60 and 60'. A hardened steel pin 63 which is an exact duplicate of the pin 58 is journaled in the bushings 65 and 65' and press-fitted into the eye at the rear end of the link 61 which closely but freely fits between the relatively opposed end faces of the bushings 65 and 65'.

An upper draft link 62 (Fig. 1) connects the upper end of the bracket 57 with an upper portion of the depending bracket 54 in the same manner as has been explained hereinbefore in connection with the lower draft link 61. The upper draft link 62 is an exact duplicate of the draft link 61 and is mounted on the brackets 54 and 57 by pivot pins 59 and 64 which are exact duplicates of the pivot pins 58 and 63, the pins 59 and 64 being journaled in hardened steel bushings the same as the bushings 60, 60' and 65, 65'. The bracket 57 is thus connected with the bracket 54 for free up and down movement relative to the latter.

A tool shank 66 is secured to the rig beam 56 by a clamping device 67 permitting vertical adjustment of the tool shank 66 on the rig beam 56, and a cultivating shovel 68 is mounted on the lower end of the tool shank 66 in the usual manner by an adjustable connection 69 permitting pivotal adjustment of the cultivating shovel about a pivot center 71 to vary the suction of the cultivating shovel 68. The shovel 68 is releasably held in its operative position on the tool shank 66 by a spring trip mechanism 72 of conventional construction.

Secured to the lower link 61 between the brackets 54 and 57 is an arm 73 which extends upwardly from the lower link and is offset towards the tractor to permit movement of the arm past the bracket 54 in a forward direction about the pivot center 58. The arm terminates at its upper end below the draft frame 28 at such a distance therefrom that it may clear the forward draft bar 31 when swung forwardly to raise the rig beam 56.

Referring to Fig. 2, the rig beam 56 has a forward portion extending longitudinally of the tractor and a rearward portion at an angle relative to the forward portion, extending rearwardly and away from the tractor, the rearward portion affording a section for mounting another cultivating shovel (not shown) in laterally offset relation to the cultivating shovel 68. Another tool support comprising a rig beam 74 is connected with the depending bracket of the plate member 46 in the same manner as has been described hereinbefore in connection with the tool support 56, 57. The rig beam 74 is similar to the rig beam 56, but angled in the opposite direction so that the rear portion of the rig beam 74 extends rearwardly towards the tractor. A cultivating shovel 76 is mounted on the forward portion of the rig beam 74 in the same manner as the cultivating shovel 68 is mounted on the rig beam 56, and the tool support carrying the shovel 76 may be raised and lowered in the same manner as the tool support carrying the shovel 68, that is, by means of an arm 77 (Fig. 2) secured to the lower one of the parallel links which are pivoted on the depending bracket of the plate member 46.

The spacing between the plate members 44, 46 on the draft frame 28 is such as to permit the shovels 68 and 76 to travel at opposite sides of a plant row extending longitudinally of the tractor, and the shovels 68 and 76 may conveniently be adjusted to work closer to or farther away from such plant row by adjustment of the plate members 44, 46 on the draft frame 28.

Another pair of rig beams 78, 79 corresponding to the rig beams 56 and 74 are arranged at the other side of the tractor and connected with the depending brackets of the plate members 52 and 53, respectively, in the same manner as has been described hereinbefore in connection with the mounting of the rig beams 56 and 74 on the draft frame 28. That is, the rig beams 78, 79 may be raised and lowered by fore and aft movement of arms 81, 82 about lower pivot centers on the brackets depending from the plate members 52 and 53.

Referring to the rear part of the cultivator which is mounted at the rear of the tractor, a stationary bracket 83 is secured to the left frame bar 17 by a pair of bolts 84, the bracket having a bearing boss 86 (Fig. 3) and extending upwardly beyond the bearing boss 86 to provide a pivot center at 87. Another stationary bracket 88, corresponding to the bracket 83, is secured to the frame bar 18 at the right side of the tractor and has a bearing boss 89 in alinement with the bearing boss 86 of the bracket 83. The bracket 88 extends upwardly beyond the bearing boss 89 to provide a pivot center at 91 (Fig. 3) corresponding to the pivot center 87 on the bracket 93. Rotatably mounted in the bearing bosses 86, 89 is a rock shaft 92 which has a rock arm 93 on its outer end at the left side of the tractor, and a rock arm 94 at the right side of the tractor. Pivoted on the outer end of the arm 93 at 96 (Fig. 1) is a bent strap 97 and a link 98 extends between the lower end of the strap 97 and a bracket 99 on the tractor. The arm 93 and the link 98 cooperate to guide the strap 97 for up and down movement relative to the tractor.

The arm 94 at the right end of the rock shaft 92 extends in the same direction as the arm 93, and another strap 101 (Fig. 3), corresponding to the strap 97, is pivoted on the arm 94 at 102 and connected at its lower end with a bracket 103 on the tractor by a link 104 (Fig. 2) corresponding to the link 98. The straps 97 and 101 carry a transverse beam 106 which has a pair of gusset plates 107 welded thereto adjacent to the straps 97 and 101, the gusset plates being rigidly secured, respectively, to the straps 97 and 101. The transverse beam 106 carries a pair of track eradicating tools, 108, 109 behind the rear wheels 1 and 2, respectively, of the tractor, and a third track eradicating tool 111 in position to loosen the soil on the track of the front wheels 3 and 4 of the tractor.

Figure 3:
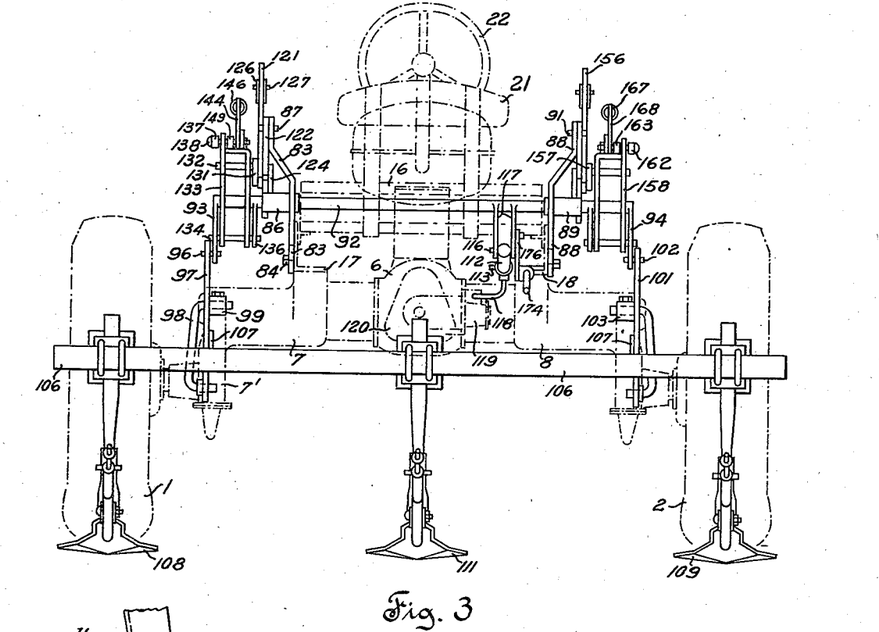
Fig. 3 is a rear view of the machine shown in Fig. 1.

Figs. 1 and 3 show the track eradicating tools in an operative position, and a one-way actuating mechanism is provided for raising the track eradicating tools from their operative to inoperative position. The one-way actuating mechanism comprises a hydraulic cylinder 112 which is pivoted on a pin 113 (Fig. 2) welded to the lower flange of the frame bar 18. A plunger 114 cooperating with the hydraulic cylinder 112 is pivotally connected at 116 to a pair of arms 117 on the rock shaft 92. Secured to one of the arms 117 (see Fig. 1) is a bracket 176 on which a crank screw 174 is adjustably mounted, and the right frame bar 18 of the tractor has an abutment at its rear end which is engageable by the screw 174 in order to limit implement lowering movement of the rock shaft 92. The hydraulic cylinder 112 is connected by a hose 118 with a pump mechanism 119 mounted at the rear of the tractor and operable by the engine 12. The pump mechanism 119 is attached to a power take-off housing 120 enclosing suitable drive mechanism for the pump. A control mechanism, not shown, is incorporated in the pump mechanism, which permits, first, delivery of pressure fluid from the pump into the cylinder 112 to cause rearward movement of the plunger 114 relative to the cylinder 112, and consequent rotation of the rock shaft 92 in an anti-clockwise direction, as viewed in Fig. 1; second, to stop delivery of pressure fluid to the cylinder 112 upon completion of the power stroke of the plunger 114, and at the same time to lock or entrap the pressure fluid in the cylinder 112, which prevents return movement of the plunger from its extended position to the position in which it is shown in Fig. 1, and third, to release the pressure fluid which has been entrapped in the cylinder 112 so that it may be discharged therefrom as further referred to hereinbelow. The control mechanism is also such as to permit the pump mechanism to idle while the plunger 114 is in the position of Figs. 1 and 2, and during such idling movement of the pump no pressure fluid is effective in the cylinder 112 to prevent rearward movement of the plunger 114 relative to the cylinder 112. Admission of pressure fluid into the cylinder 112, as stated, causes the plunger 114 to rotate the rock shaft 92 in an anticlockwise direction as viewed in Fig. 1, and such anticlockwise rotation of the rock shaft causes the arms 93, 94 to move from an implement lowered position to an implement raised position. The rearward implement unit comprising the transverse beam 106 is thereby moved from a lowered to a raised position, and when the plunger 114 reaches the end of its travel, the control mechanism may be operated to stop delivery of pressure fluid into the cylinder so as to hold the transverse beam 106 in its elevated position.

The bracket 83 at the left side of the tractor has an upwardly extending portion affording a pivot center 87, as has been stated hereinbefore, and swingable on the pivot center 87 is a hand lever comprising a handle bar 121 and a crossbar 122 which is welded to the handle bar 121 and pivoted to the bracket 83 at the pivot center 87. A latch 123 is pivoted on the free end of the cross bar 122, and a notched segment 124 engageable by the latch 123 is secured in a fixed position on the bearing boss 86 of the bracket 83. The latch 123 is held by a suitable spring (not shown) in engagement with the notched segment 124 and may be released manually by means of a grip lever 126 which is pivoted on the handle bar 121, at 127, and connected with the latch 123 by a heavy wire 128. Pivoted on the rear end of the handle bar 121 at a pivot center 129 is a first link 131 which has a second pivot center 132 at a distance from the pivot center 129 equal to the spacing of the pivot center 129 from the pivot center 87. Pivotally connected with the first link 131 at the pivot center 132 is a second link 133 which has a pivotal connection with the arm 93 at a pivot center 134. Referring to Fig. 3, it will be seen that the second link 133 has a relatively long arm adjacent to the arm 93 of the rock shaft 92 and a shorter arm adjacent to a second arm 136 of the rock shaft 92, a pin extending through the arms 93 and 136 of the rock shaft and through the arms of the second link 133, affording the pivotal connection 134. Another pin extending through both arms of the link 133 affords the pivot center 132 on which the first link 131 is connected with the second link 133.

Figures 4, 6:
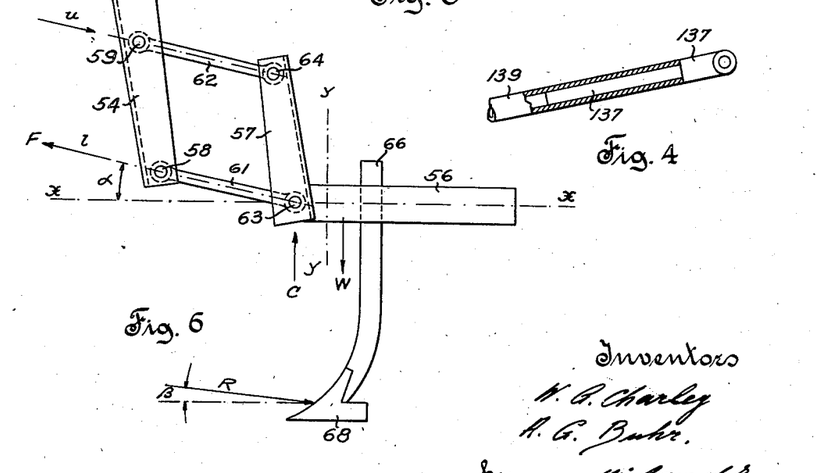
Fig. 4 is an enlarged view of a detail of the cultivator shown in Figs. 1 to 3.
Fig. 6 is a diagrammatic view of one of the front tool units of the cultivator shown in Fig. 1, together with its draft connections, the diagrammatic view illustrating the distribution of forces to which the tool unit and draft connections are subjected during operation of the cultivator.

The outer arm of the second link 133 extends beyond the pivot center 132, and a shoulder pin 137, best shown in Fig. 4, is pivotally connected to the upper end of the second link 133 by means of a pivot pin 138. A tubular rod 139 is telescopically slidable, at its rear end, on the shoulder pin 137, and welded to the forward end of the tubular rod 139 is a nut 141. An eye-bolt 142 is threaded into the nut 141 and pivotally connected at its eye with the upper end of the arm 73 on the lower draft link 61 by means of a pivot pin 143. Referring again to the second link 133 at the rear end of the cultivator, a rearwardly and upwardly extending bracket arm 144 is rigidly secured to the second link 133, and a coil spring 146 is hooked at one end into an eye at the upper end of the bracket arm 144. The other end of the spring 146 has a chain connection 147 with a lug 148 on the tubular rod 139.

Pivoted on the pin 138 is another shoulder pin 149 (Fig. 2) corresponding to the shoulder pin 137, and a second tubular rod 151 is telescopically movable at its rear end on the shoulder pin 149. The second tubular rod 151 is connected at its forward end with the arm 77 of the lower draft link for the rig beam 74 in the same manner as has been described in connection with the rod 139, that is, an eye-bolt 152 is screwed into a nut at the forward end of the rod 151 and pivotally connected with the arm of the lower draft link for the rig beam 74. The forward end of the spring 146 has a chain connection 153 with a lug 154 on the rod 151, as shown in Fig. 2.

The tool supports at the right side of the tractor comprising the rig beams 78, 79 are operatively connected with the rock shaft 92 by a mechanism which is a duplicate of the mechanism at the left side of the tractor, which has been described hereinbefore, the mechanism at the right side, however, being arranged opposite hand relative to the mechanism at the left side, as may be seen from Figs. 2 and 3. The mechanism at the right side of the tractor comprises a handle bar 156 corresponding to the handle bar 121, the handle bar 156 being swingable about the mentioned pivot center 91 on the bracket 88 at the right side of the tractor and operatively connected with the rock shaft 92 by a first link 157 and second link 158, corresponding to the first link 131 and second link 133. A pair of tubular rods 159, 161 are pivotally and slidably connected with the second link 158 at the right side of the tractor by means of shoulder pins 162, 163 corresponding to the shoulder pins 137 and 149. Eye-bolts 164, 166 adjustably connect the rods 159, 161 with the arms 81, 82 of the lower draft links for the rig beams 78 and 79. A spring 167 is hooked, at its rear end, into a bracket 168 (Fig. 3) on the second link 158 at the right side of the tractor, and a pair of chains 169, 171 connect the spring 167 with lugs 172, 173 on the rods 159, 161, respectively.

Considering the operation of the mechanism which connects the rock shaft 92 with the forward implement units at the left side of the tractor, that is, with the outer implement unit comprising the rig beam 56, and with the inner implement unit comprising the rig beam 74, the following is to be noted. In the operative position of the front and rear implement units, as shown in Fig. 1, the rear end of the tubular rod 139 abuts against the shoulder of the shoulder pin 137, the rear end of the tubular rod 151 likewise abuts against the shoulder of the shoulder pin 149, and the screw 174 bears upon the abutment on the frame bar 18 of the tractor. The upper and lower draft links 61 and 62, of the outer unit extend rearwardly and downwardly from the bracket 54 at a relatively small angle relative to the horizontal, and when the tractor advances, the draft force acts upon the rig beam 56 in the direction of the axis of the lower link 61 and may be considered as the resultant of a horizontal component and a vertical component, the latter exerting a lifting effect upon the rig beam 56, proportional to the draft force. This lifting effect of the vertical component of the draft force is counteracted by the weight of the outer implement unit connected with the rear ends of the links 61, 62 plus one half of the weight of the links 61 and 62. The shovel 68, when drawn through the ground, develops a suction force which acts vertically in a downward direction and which, like the mentioned weight of the outer implement unit and one-half of the weight of the links 61 and 62, counteracts the lifting effect of the vertical component of the draft force. While the tractor advances, the soil resistance encountered by the shovel 68 may vary as the shovel runs into hard and soft spots of the ground and into local rises and hollows of the ground, with the result that the draft force alternately increases and decreases. A certain soil resistance, however, may be assumed to be prevalent as a normal working condition, and under said normal working condition the combined gravitational and suction forces acting upon the outer implement unit overbalance the vertical component of the draft force. This result is obtained without excessive weight of the implement unit and with ordinary suction of the shovel or shovels mounted on the rig beam 56 due to the relatively small angle of the links 61 and 62 relative to the horizontal.

Considering the tractor as a traveling support, the draft frame 28 and associated parts as draft means, and the rig beam 56 and associated parts as an implement unit including a suction producing ground engaging tool, it will be noted that the draft means include an element, namely the link 61, transmitting draft from the traveling support to the implement unit in the normal operating position of the latter on a forwardly and upwardly inclined line of draft at such an angle relative to the ground level that the vertical component of the draft force acting upon said implement unit under normal working conditions is overbalanced by the gravitational and suction forces acting upon said implement unit in its normal operating position during advance movement of the machine.

Due to the superiority of the combined gravitational and suction forces over the vertical component of the draft force, under normal working conditions, the arm 73 exerts a backward push upon the rod 139, which is transmitted to the shoulder pin 137, the rear end of the rod normally abutting against the shoulder pin as has been stated hereinbefore.

The inner forward implement unit at the left side of the tractor, that is, the one comprising the rig beam 74, performs in the same manner as has been discussed hereinbefore in connection with the outer one comprising the rig beam 56. In other words, the rod 151 is likewise subjected to a rearward push under normal working conditions, and such rearward push acts upon the shoulder pin 149 which, like the shoulder pin 137, is pivoted on the second link 133 at 138. The combined rearwardly directed forces acting upon the pivot center 138 are transmitted in part through the second link 133 to the rock arm 93, so as to force the screw 174 against the abutment of the frame bar 18 of the tractor, and in part through the second link 133 to the first link 131 which transmits them to the hand lever 121, 122. Since the hand lever is locked on the segment 124 the forces transmitted thereto through the link 131 are finally taken up on the bracket 83 at the pivot center 87 and at the bearing boss 86.

Assuming now that the shovels 68 and 76 run into a soft spot or a hollow which will cause a decrease of the draft force. Such a condition will have no effect upon the position of the shovels because it results merely in an increased rearward push upon the rods 139 and 151 due to a decrease of the vertical component of the draft force which counteracts the combined gravitational and suction forces on the outer implement unit, and the increased rearward push on the rods 139 and 151 is taken up at the shoulder pins 139 and 149 which cannot move rearwardly from the position in which they are shown in Fig. 1.

The result is entirely different, however, if the shovels 68 and 76 should run into a hard spot or into a local rise of the ground. In that case the draft force increases and it may first be assumed for purposes of explanation that its vertical component becomes strong enough to balance the combined gravitational and suction forces of the inner and outer forward implement units at the left side of the tractor. This will leave the rods 139 and 151 in the position in which they are shown in Figs. 1 and 2, but the rods will no longer be subject to rearward push by the arms 73 and 77. Upon further increase of the draft force the rods 139 and 151 become subjected to a forward pull which will be transmitted through the chains 147 and 153 to the spring 146. When the cultivator is in its operating position as shown in Fig. 1 and while the rear ends of the rods 139 and 151 abut against the shoulders of the shoulder pins 137 and 149, the spring exerts a rearward pull upon the chains 147 and 153, the latter being adjusted to such length as to stretch the spring, and thereby provide an initial force resisting forward pull on the rods 139 and 151.

Referring to Fig. 1, it will be noted that the mechanism which connects the outer front implement unit with the rock shaft 92 comprises two sections, namely a first one having fixed pivot centers at 58 and 92, and movable pivot centers at 143, 138, and 134; and a second section having a fixed pivot center at 129 and a movable pivot center at 132. The rod 139 and the shoulder pin 137 bearing normally solid upon each other may be considered as a reciprocable link of the first section, and the second link 133 and bracket arm 144 may be considered as another reciprocable link of the first section, while the arm 73 and the arm 93 may be considered as a first and a second rock arm, respectively, of the first section. The tensioned spring 146 reacts between the reciprocable links of the first section on a line overlying the pivot center 138, and the tension of the spring 146, therefore, tends to shift the first section by angular displacement of the reciprocable link constituted by the link 133 and bracket arm 144 relative to the reciprocable link constituted by the rod 139 and the shoulder pin 137, but such tendency of the spring 146 remains substantially ineffective, in the position of the parts shown in Fig. 1, because the effective line of pull of the spring 146 extends in relatively close proximity to the pivot center 138. The link 131 opposes swinging movement of the reciprocable link 133, 144, about the pivot center 134 when the tension of the spring 146 is called upon to resist a forward pull on the rod 139. It will be noted that the link 131, in the position of the parts shown in Fig. 1, occupies a toggle position relative to the reciprocable link constituted by the rod 139 and shoulder pin 137, and that the link 131 is subject to compression when a forward pull on the rod 139 is superimposed upon the tension of the spring 146 and, as a result, the forward pull on the bracket 144 increases. Due to said toggle position of the link 131 the tendency of the link 131 to swing upwardly, under the mentioned conditions, about its pivot center 129 is very low, and the spring 146 may be tensioned considerably in the toggle position of the link 131 shown in Fig. 1, before any appreciable lifting force is transmitted to the rear implement unit comprising the cross beam 106 and track eradicating tools 108, 109 and 111. In other words the toggle position of the link 131 relative to the reciprocable link 139, 137, or the toggle position of the reciprocable link 139, 137 relative to the link 131, affords a relatively small lever ratio between the first swingable link or rock arm 73 and the link 131. On the other hand, it will be noted that in the toggle position of the reciprocable link 139, 137 relative to the link 131 the lever ratio between the second swingable link or rock arm 93 and the link 131 is relatively large.

The rod 151 and shoulder pin 149 perform in the same manner as the rod 139 and the shoulder pin 137, and what has been said hereinbefore regarding the toggle position of the link 131 relative to the reciprocable link constituted by the rod 139 and shoulder pin 137 also applies to the rod 151 and shoulder pin 149.

As long as the rods 139 and 151 are subject to rearward push, as they are under normal working conditions and when the draft force decreases, the tension of the spring 146 supplements such rearward push but has no effect to hold the shovels 68 and 76 in the ground, soil penetration of the shovels being entirely dependent, under normal working conditions, on the gravitational and suction forces acting upon the respective tool units. However, if the shovels 68 and 76 should run into hard ground, or into a local rise of the ground, the vertical component of the draft force may increase sufficiently so that it will not only balance the gravitational and suction forces of the forward tool units but also exert a forward pull on the rods 139 and 151 greater than the initial tension of the spring 146. In that case the rods 139 and 151 will pull away from the shoulders of the shoulder pins 137 and 149, and the shovels 68 and 76 will rise to a higher level. As a result, the shovels 68 and 76 will encounter less soil resistance, and a state of equilibrium will develop between the increased vertical component of the draft force, on the one hand, and the combined gravitational and suction forces plus the increased tension of the spring 146 on the other hand. In other words, if the shovels run into hard ground or into a local rise of the ground, the shovels will not jump out of the ground but stay in and merely ride at a somewhat different depth than under normal working conditions.

Referring to Fig. 6 which shows a diagrammatic view of the outer forward tool unit at the left side of the tractor together with its draft connections, the arrow W indicates the weight of the tool unit including the tool support 56, 57 and of the tool or tools mounted thereon plus one-half of the weight of the links 61 and 62. The arrow R indicates the soil reaction whose direction and magnitude vary according to soil conditions and according to the number and shape of the suction producing tools mounted on the rig beam 56. The arrow $l$ indicates the pull on the lower link 61, and the arrow $u$ indicates the push on the upper link. The forces $u$ and $l$ affect the tool support as one force F which acts axially of the lower link 61 and in the direction of the force $l$. The arrow C indicates an imaginary vertical force which would have to act upon the tool support 56, 57 in order to balance the force W plus the vertical component of R against the vertical component of F.

The direction and magnitude of the force C may easily be calculated for any given operating condition as follows. Assuming W to be 40 pounds; R to be 100 pounds; angle $\alpha$ to be 20 degrees, and angle $\beta$ to be 10 degrees, then a first condition to be met is that the sum of the forces in the direction of the line $x$—$x$, designated as $\Sigma F_x$ must be zero; that is:

(1) $\quad \Sigma F_x = F(\cos \alpha) - R(\cos \beta) = 0$
$\quad = F(0.94) - 100(0.985) = 0$ it follows from Equation (1) that $$F = \frac{98.5}{0.94}$$

$F = 105$ pounds

A second condition to be met is that the sum of the forces in the direction of the line $y$—$y$, designated as $\Sigma F_y$ must be zero; that is:

(2) $\quad \Sigma F_y = F(\sin \alpha) + C - W - R(\sin \beta) = 0$
$\quad = 105(0.342) + C - 40 - 100(0.174) = 0$ from Equation (2) follows:

$C = -35.9 + 40 + 17.4$
$C = 21.5$ pounds

That is, under the assumed conditions a force of 21.5 pounds acts downwardly on the tool support 56, 57 and produces a corresponding rearward push on the rod 139, which rearward push is taken up on the shoulder pin 137. It will be seen that if R increases to 220 pounds while the other assumed quantities remain unchanged, F increases to 231 pounds and C becomes zero, and if R becomes greater than 220 pounds, F increases accordingly and C becomes negative, which means that the shovel 68 tends to come out of the ground and that the rod 139 is subject to a certain pull in a forward direction. Such pull, as stated, will have to exceed the initial tension of the spring 146 before the rod 139 pulls away from the shoulder of the shoulder pin 137.

Referring to the lever comprising the handle bar 121 and cross arm 122, it will be noted that adjustment of this lever about its pivot axis at 87, in the position of the parts shown in Fig. 1, changes the operating depth of the cultivating shovels 68 and 76. Adjustment of said lever in an upward direction is effective to swing the second reciprocable element constituted by the link 133 and bracket arm 144 forwardly about the pivot center 134, with the result that the first reciprocable elements constituted by the rods 139, 151 and their respective shoulder pins 137 and 149 are moved forwardly and the shovels 68 and 76 are adjusted to a shallower depth than shown in Fig. 1. On the other hand, adjustment of the lever 121, 122 in a downward direction from the position in which it is shown in Fig. 1, moves the shovels 68 and 76 to a deeper operating position, as will be obvious. The mentioned toggle position of the link 131 relative to the reciprocable links represented by the rods 139, 151, and shoulder pins 137, 149, is affected very little by up and down adjustment of the depth lever 121, 122, and the action of the spring 146 is essentially the same as has been discussed hereinbefore irrespective of the position to which the depth lever 121, 122 may happen to be adjusted.

The mechanism at the right side of the tractor, which connects the rock shaft 92 with the implement units comprising the rig beams 78 and 79 operates in the same manner as the mechanism at the left side of the tractor, and what has been said hereinbefore regarding the operation of the mechanism at the left side of the tractor also applies to the mechanism at the right side of the tractor.

Admission of pressure fluid into the cylinder 112 causes anti-clockwise rotation of the rock shaft 92, as viewed in Fig. 1, and consequently upward movement of the rock arm 93 from the position in which it is shown in said figure. The link 133, which is pivoted on the arm 93 at 134 is guided on the tractor by the link 131 for movement relative thereto by movement of the arm 93, and when the arm 93 swings upwardly the linkage comprising the arms 73, 93 and the two reciprocable links 139, 137 and 133, 144 is shifted, with the result that the spacing of the effective line of pull of the spring 146 from the pivot center 138 increases. As the arm 93 swings upwardly the tension of the spring 146 becomes more and more effective to assist the shifting of the linkage initiated by upward movement of the rock arm 93. After a relatively short upward movement of the arm 93'' from the position in which it is shown in Fig. 1, the tension of the spring will materially assist the plunger 114 to raise the rearward implement unit and the forward implement units at the left side of the tractor, lifting force being transmitted to the forward implement units through the rods 139 and 151, the rod 151 performing in the same manner as has been discussed in connection with the rod 139.

The spring 146, therefore performs two functions, first, to hold the forward implement units in the ground when the tools run into hard ground and under similar adverse operating conditions, and second to facilitate the raising of the front and rear implement units. The latter function of the spring is of particular advantage, if instead of a power actuated mechanism, such as the hydraulic cylinder 112 and plunger 114, a manually operated lifting lever is employed.

It will be noted that the mechanism for raising and lowering the outer front implement unit at the left side of the tractor comprises an actuating element, represented by the link 133, which is movable from a first to a second position, and vice versa, and that means are provided to hold the actuating element in either of said positions, the link 131 and the crank screw 174 being effective to hold the actuating element in its first position in which it is shown in Fig. 1, and the link 131 and the hydraulic jack being effective to hold the actuating element in a second position when pressure fluid is admitted into and entrapped within the cylinder 112. Considering the shoulder pin 137 as a thrust member pivoted to the actuating element 133, and the connection between the shoulder pin 137 and the outer front implement unit at the left side of the tractor by means of the tubular rod 139 as a lost motion connection, it will further be noted that said lost motion connection permits upward movement of the implement unit from its normal operating position while the actuating element is held in its first position, and that said lost motion connection is operable to raise the implement unit to an inoperative position by movement of the actuating element 133 from its first into its second position. The spring 146 represents resilient means reacting between the actuating element and the implement unit to assist movement of the actuating element from said first to said second position, and the spring is effective, when the actuating element is held in its first position, to supplement the mentioned gravitational and suction forces so as to urge said implement unit towards said operating position thereof upon increase of the draft force.

Referring to the plunger 114 as a reciprocable element, it will be further noted that said reciprocable element is movable from a first to a second position by fluid pressure created by the engine of the tractor, and that the raising and lowering mechanism for either of the front tool supports is connected with the plunger 114 so as to raise said tool support from an operative to an inoperative position by movement of the plunger from said first to said second position, and so as to return the plunger, upon release of said fluid pressure, to said first position thereof by gravitational movement of the tool support from its inoperative to its operative position. For purposes of definition the link 133 and the rod 139 may be referred to as a pair of actuating elements which are respectively connected with the tool support and with the reciprocable element 114, and it will be noted that one of said actuating elements has a lost motion connection with the other for the purposes stated hereinbefore.

The travel of the plunger 114 is limited so that at the end of the power stroke of the plunger the pivot center 132 coincides with the pivot center 87, the spacing between the pivot centers 129 and 132 being equal to the spacing between the pivot centers 129 and 87, as has been pointed out hereinbefore. As a result of this arrangement the depth lever 121, 122 may be moved, in the raised position of the cultivator, about its pivot center at 87 to any position of adjustment along the segment 124 without causing movement of the link 133 and consequent up and down movement of the front implement units at the left side of the tractor. In other words, irrespective of the position to which the hand lever 121, 122 has been adjusted to obtain any desired depth of soil penetration of the cultivating shovels 68 and 76 in normal operation, upward movement of the rock arm 93 by a full stroke of the plunger 114 will raise the cultivating shovels 68 and 76 to a predetermined height above the ground, and the hand lever 121, 122 may be adjusted to its extreme lower or to its extreme upper position without affecting the height to which the forward implement units are raised above the ground by a full stroke of the plunger 114. The mechanism which connects the rock shaft 92 with the front tools at the left side of the tractor therefore functions in the manner of a constant height lift mechanism, and the mechanism which connects the rock shaft 92 with the front tools at the right side of the tractor, being an opposite hand duplicate of the lift mechanism at the left side of the tractor, also functions in the manner of a constant height lift mechanism.

In the inoperative or raised position of the cultivator, the weight of the implement unit connected with the bracket 54 tends to swing the arm 73 in a rearward direction resulting in a backward push upon the tubular rod 139, and the tubular rods 151, 159, and 161 are similarly subjected to a rearward push in the raised position of the implement due to the weight of the forward implement units connected with said rods. The rearward push acting upon the rods 139 and 151 in the raised position of the cultivator, due to the weight of the forward implement units at the left side of the tractor, is transmitted in part through the second link 133 to the rock arm 93, and in part through the second link 133, the first link 131, handle bar 121 and cross-bar 122 to the pivot center 87 on the bracket 83 which is fixed on the tractor. Similarly, the rearward push acting upon the rods 159 and 161 in the raised position of the cultivator, due to the weight of the forward implement units at the right side of the tractor, is transmitted in part through the second link 158 to the rock arm 94, and in part through the link 157, handle bar 156 and its cross-arm to the bracket 88 on the tractor. The weight components of the forward implement units at the left and right sides of the tractor, which are transmitted to the rock shaft 92 through the links 133 and 158 in the raised position of the cultivator tend to rotate the rock shaft 92 in a clockwise direction as viewed in Fig. 1, and the weight of the rearward implement unit comprising the transverse beam 106 and track eradicating tools 108, 109, 111 also tends to rotate the rock shaft 92 in clockwise direction as viewed in Fig. 1.

The weight of all forward implement units and the weight of the entire rear implement unit will therefore cooperate to produce a torque upon the rock shaft 92 in a clockwise direction, as viewed in Fig. 1, which torque will become effective to rotate the rock shaft upon release of the fluid which is entrapped in the cylinder 112 in order to hold the forward and rearward implement units in their inoperative position. The clockwise rotation of the rock shaft 92 will continue until the crank screw 174 which is mounted in the bracket 176 on one of the arms 117 of the rock shaft engages the fixed abutment on the right frame bar 18 on the tractor. The depth to which the track eradicating tools penetrate the ground may be adjusted by rotation of the crank screw 174, while the normal depth to which the forward cultivating shovels penetrate the ground may be adjusted by the depth levers at opposite sides of the tractor, as has been explained hereinbefore.

Clockwise rotation of the rock shaft 92 towards the position in which it is shown in Fig. 1 will also restore the mentioned initial tension of the springs 146 and 167, which has been reduced by upward movement of the rock arms 93 and 94, and it will also push the plunger 114 back into the cylinder 112, which backward movement of the plunger will transfer the fluid from the cylinder 112 through the hose 118 back into a sump within the power take-off housing 120.

When the machine traverses a field with the tools lowered to operative position, a stone or other obstruction may be encountered by one of the front shovels, and the corresponding rig beam may be forced upwardly from its normal operating position. Assuming that such action takes place on the rig beam 56, it will be seen that the rod 139 will be pulled forwardly, but such forward pull will not be transmitted to the adjacent rod 151, since the chain 147 takes the whole pull, while the chain 153 relieves the rod 151 from the tension of the spring 146, but the rig beam 74 will not rise as long as the soil resistance encountered by the shovel or shovels of the rig beam 74 remain normal in which case the gravitational and suction forces on the rig beam 74 overbalance the vertical component of the draft force transmitted to the rig beam 74 and the rod 151 is subject to a rearward push in spite of the slackening of the chain 153. The shovel or shovels on the rig beam 74 therefore will stay in the ground while the rig beam 56 is pushed upward from its normal position, by an unyielding obstruction.

For purposes of definition the rearward rock arm 93 may be considered as an actuating arm, and either of the forward rock arms 73 and 77 which are connected, respectively, with the outer and inner implement units at the left side of the tractor, may be considered as an implement lifting arm. The hydraulic jack comprising the cylinder 112 and plunger 114 constitutes an actuating means for moving the actuating arm 93 from implement lowered to implement raised position, and either of the implement lifting arms 73, 77 is movable from implement lowered position in implement raising direction independently of the actuating arm. The mentioned lost motion connection between the shoulder pin 137 and the arm 73 by means of the tubular rod 139 is effective between the actuating arm 93 and the lifting arm 73, and functions to move the lifting arm 73 from implement lowered to implement raised position by corresponding movement of the actuating arm 93, and said lost motion connection also permits said independent movement of the lifting arm 73 from its implement lowered towards its implement raised position while the actuating arm 93 is in its implement lowered position. The resilient means represented by the spring 146 are operatively connected with the actuating arm 93 and with the implement lifting arm 73 so as to assume a progressively strained condition by movement of the actuating arm 93 and lifting arm 73 to their implement lowered positions, and in said strained condition the spring 146 is effective to yieldingly restrain said independent movement of the lifting arm 73 and to assist in moving said lifting arm in implement raising direction upon movement of the actuating arm 93 from its implement lowered towards its implement raised position.

Considering the rod 139 as a reciprocable member pivoted to the first rock arm or implement lifting arm 73, it will be noted that the reciprocable member 139 is pivotally and slidably connected to the second link 133, and that the shoulder on pin 137 prevents sliding movement of the reciprocable member 139, by implement lowering movement of the arm 73, beyond a predetermined position relative to the link 133. The spring 146 biases the pivotal and slidable connection between the reciprocable member 139 and the link 133, and the spring is adapted to urge the reciprocable member 139 towards said predetermined position relative to the link 133.

The forward lifting arm 77 for the inner implement unit at the left side of the tractor is movable from an implement lowered position in implement raising direction independently of the forward lifting arm 73, and the lost motion connections between the shoulder pins 137 and 149 and the arms 73 and 77 by means of the rods 139 and 151 function as a lost motion device for moving both of said lifting arms from implement lowered position to implement raised position by a corresponding movement of the actuating arm 93, and permitting each of the lifting arms 73, 77 to move from its implement lowered position in implement raising direction independently of the actuating arm 93. The spring 146 has one-way actuating connections, respectively, with the lifting arms 73 and 77 by means of the chains or flexible tension members 147, 153, and a connection with the actuating arm 93 so as to assume a progressively strained condition by movement of the arms 73, 77 and 93 from their implement raised to their implement lowered positions, and in that strained condition the spring 146 is effective to yieldingly restrain the lifting arms 73, 77, severally and jointly, from movement in implement raising direction while the actuating arm 93 is in its implement lowered position, and to assist in moving the lifting arms 73, 77 in implement raising direction upon movement of the actuating arm 93 from its implement lowered towards its implement raised position.

While in the foregoing a preferred embodiment of the invention has been described with reference to the drawings, it should be understood that it is not intended to limit the invention to the exact details of construction herein shown and described for various modifications within the scope of the appended claims may occur to persons skilled in art.

It is claimed and desired to secure by Letters Patent:

1. In an agricultural machine, a traveling support, an implement unit including a suction producing ground engaging tool, draft means connecting said implement unit with said support for up and down movement relative thereto and including an element transmitting draft from said support to said implement unit in the normal operating position of the latter on a forwardly and upwardly inclined line of draft at such an angle relative to the ground level that the vertical component of the draft force acting upon said implement unit under normal working conditions is overbalanced by the gravitational and suction forces acting upon said implement unit in its normal operating position during advance movement of the machine, and means for raising and lowering said implement unit comprising an actuating element movable from a first to a second position and vice versa, means for holding said actuating element in either of said positions thereof, a thrust member pivoted on said actuating element and having a lost motion connection with said implement unit to permit upward movement of said implement unit from said normal operating position thereof while said actuating element is held in its first position, and operable to raise said implement unit to an inoperative position by movement of said actuating element from its first into its second position, and resilient means connected to said actuating element independently of said thrust member, and reacting between said actuating element and said implement unit to assist movement of said actuating element from said first to said second position, said resilient means being effective, when said actuating element is held in said first position, to supplement said gravitational and suction forces so as to urge said implement unit towards said operating position thereof upon increase of said draft force.

2. In combination with a tractor, a tool support, means connecting said tool support with said tractor for up and down movement relative thereto, a reciprocable element movable from a first to a second position by fluid pressure created by the engine of said tractor, and adapted to return from said second to said first position thereof upon release of said fluid pressure, and raising and lowering means for said tool support operatively connected with said reciprocable element so as to raise said tool support from an operative to an inoperative position by movement of said reciprocable element from said first to said second position thereof and so as to return said reciprocable element to said first position thereof by gravitational movement of said tool support from said inoperative to said operative position thereof, said raising and lowering means including a pair of actuating elements respectively connected with said tool support and with said reciprocable element, a thrust member pivoted on one of said actuating elements and having a lost motion connection with the other of said actuating elements to permit upward movement of said tool support from said operative position thereof while said reciprocable element occupies said first position, and resilient means connected to said one actuating element independently of said thrust member and reacting between said actuating elements to assist movement of said reciprocable element from said first to said second position and effective, when said reciprocable element is in said first position, to yieldingly resist upward movement of said tool support from its operative position.

3. In combination with a tractor, a first implement unit including suction producing ground engaging tools, draft means connecting said implement unit with said tractor for up and down movement relative thereto and including an element transmitting draft from said tractor to said implement unit in the normal operating position of the latter on a forwardly and upwardly inclined line of draft at such an angle relative to the ground level that the vertical component of the draft force acting upon said implement unit under normal working conditions is overbalanced by the gravitational and suction forces acting upon said implement unit in its normal operating position during advance movement of the tractor, a reciprocable element movable from a first to a second position by fluid pressure created by the engine of said tractor, and adapted to return from said second to said first position thereof upon release of said fluid pressure, a rock shaft mounted on said tractor and operatively connected with said reciprocable element to be rotated by movement of the latter from its first into its second position; a pair of actuating elements connected respectively with said rock shaft and with said implement unit, a lost motion connection between said actuating elements permitting upward movement of said implement unit from its normal operating position while said reciprocable element is in its first position, and operable to raise said implement unit to an inoperative position by movement of said reciprocable element from its first to its second position, resilient means biasing said lost motion connection and tending to raise said implement unit upon movement of said reciprocable element from its first towards its second position, said resilient means being effective to supplement said gravitational and suction forces so as to urge said implement unit towards its operating position upon increase of said draft force; a second implement unit mounted on said tractor for up and down movement relative thereto and operatively connected with said rock shaft so as to be raised from an operative to an inoperative position by movement of said reciprocable element from its first to its second position, and so as to hold said rock shaft by the weight of said second implement unit in said operative position of the latter against rotation in the direction in which it is movable by said reciprocable element.

4. In an agricultural machine, a traveling support, a first and a second rock arm swingable about relatively fixed pivot centers, respectively, on said traveling support, a first link swingable about a third pivot center on said traveling support, a thrust transmitting connection between said rock arms comprising a second link pivoted to said second rock arm and pivotally connected to said first link, a reciprocable member pivoted to said first rock arm and connected with said second link for pivotal and limited sliding movement relative thereto to permit relative movement of said rock arms in one direction and limit relative movement of said rock arms in the opposite direction, and resilient means biasing said pivotal and slidable connection between said second link and said reciprocable member, adapted to yieldingly oppose said relative movement of said rock arms in said one direction, said thrust transmitting connection being operable by rocking movement of said second rock arm to swing said first link about its pivot center on said support into and out of a toggle position relative to said reciprocable member, affording a relatively small lever ratio between said first rock arm and said first link, and a relatively large lever ratio between said second rock arm and said first link, and first and second implement units connected, respectively, with said first and second rock arms and tending, by their weight, to move said first link and reciprocable member towards said toggle position relative to each other.

5. In an agricultural machine, a traveling support, a first and a second rock arm swingable about relatively fixed pivot centers on said traveling support, a lever swingable about a third pivot center on said traveling support, releasable locking means for securing said lever in different positions of pivotal adjustment relative to said support, a first link pivoted on said lever, a second link pivotally connected with said first link and with said second rock arm, a pair of relatively reciprocable thrust transmitting elements connected, respectively, with said first rock arm and with said second link, stop means limiting relative movement of said thrust transmitting elements in one direction, resilient means resisting relative movement of said thrust transmitting elements in the opposite direction, whereby movement of said second rock arm in one direction will be positively transmitted to said first rock arm, and said first rock arm may resiliently move in the same direction independently of said second rock arm, and first and second implement units connected, respectively, with said first and second rock arms and tending, by their weight, to move said rock arms in the opposite direction, said first link being freely swingable on said lever to permit lifting of said first and second implement units by swinging movement of said second rock arm independently of movement of said lever, and up and down adjustment of said first implement unit, independently of said second implement unit, by movement of said lever independently of movement of said second rock arm.

6. An implement adjusting mechanism for agricultural machines, comprising an actuating arm movable from implement lowered to implement raised position, and vice versa, a lifting arm movable from implement lowered position in implement raising direction independently of said actuating arm, a lost motion connection between said arms for moving said lifting arm from implement lowered position to implement raised position by corresponding movement of said actuating arm and permitting said independent movement of said lifting arm, and resilient means operatively connected with said arms so as to assume a progressively strained condition by movement of said arms to their implement lowered positions, effective to yieldingly restrain said independent movement of said lifting arm and to assist in moving said lifting arm in implement raising direction upon movement of said actuating arm from its implement lowered to implement raised position.

7. An implement adjusting mechanism for agricultural machines, comprising an actuating arm movable from implement lowered to implement raised position, and vice versa, a pair of implement lifting arms each movable from implement lowered position in implement raising direction independently of the other, a lost motion device connecting said actuating arm with said lifting arms for moving both of said lifting arms from implement lowered position to implement raised position by a corresponding movement of said actuating arm and permitting each of said lifting arms to move from its implement lowered position in implement raising direction independently of said actuating arm, and a single resilient element having one-way actuating connections, respectively, with said lifting arms and a connection with said actuating arm so as to assume a progressively strained condition by movement of all of said arms from their implement raised positions in implement lowering direction, effective to yieldingly restrain said lifting arms, severally and jointly, from said movement in implement raising direction while said actuating arm is in its implement lowered position, and so as to assist in moving said lifting arms in implement raising direction upon movement of said actuating arm from its implement lowered to implement raised position.

8. An implement adjusting mechanism for agricultural machines, comprising an actuating arm pivoted on the machine for movement from implement lowered to implement raised position, and vice versa, a link pivoted on said actuating arm and guided on the machine for movement relative thereto by said movement of said actuating arm, a pair of implement lifting arms pivoted on the machine for movement independently of each other and independently of said actuating arm, from implement lowered position in implement raising direction, a pair of reciprocable members pivotally connected to said lifting arms, respectively, and each pivotally and slidably connected to said link, means for limiting sliding movement of said reciprocable members relative to said link whereby both of said lifting arms will be moved from implement lowered to implement raised position by a corresponding movement of said actuating arm, a tension spring connected at one end to said link, and flexible tension members connecting the other end of said spring with said reciprocable members, respectively, said spring being progressively elongated by movement of all of said arms from their implement raised positions in implement lowering direction, and effective to assist in moving said lifting arms from their implement lowered to implement raised positions by said corresponding movement of said actuating arm.

9. In an agricultural machine, a traveling support, an actuating arm pivoted on said support, a link pivoted on said actuating arm and guided on said support for movement relative thereto by movement of said actuating arm, an implement lifting arm pivotally movable on said support in implement raising and lowering directions independently of movement of said actuating arm, a reciprocable member pivotally connected to said lifting arm and pivotally and slidably connected to said link, means for preventing sliding movement of said reciprocable member, by implement lowering movement of said lifting arm, beyond a predetermined position relative to said link, and resilient means biasing said pivoted and slidable connection between said reciprocable member and said link, adapted to urge said reciprocable member towards said predetermined position relative to said link.

10. In an agricultural machine, a traveling support, an actuating arm pivoted on said support, a first link pivoted on said support, a second link pivoted at relatively spaced points thereof to said actuating arm and first link, an implement lifting arm pivotally movable on said support in implement raising and lowering directions independently of movement of said actuating arm, a reciprocable member pivotally connected to said lifting arm and pivotally and slidably connected to said second link, means for preventing sliding movement of said reciprocable member, by implement lowering movement of said lifting arm, beyond a predetermined position relative to said second link, and resilient means biasing said pivotal and slidable connection between said reciprocable member and said second link, adapted to urge said reciprocable member towards said predetermined position relative to said second link.

11. In an agricultural machine, a traveling support, an actuating arm pivoted on said support, a lever mounted on said support for adjustment to different positions, a first link pivoted to said lever, a second link pivoted at relatively spaced points thereof to said actuating arm and first link, an implement lifting arm pivotally movable on said support in implement raising and lowering directions independently of movement of said actuating arm, a reciprocable member pivotally connected to said lifting arm and pivotally and slidably connected to said second link, means for preventing sliding movement of said reciprocable member, by implement lowering movement of said lifting arm, beyond a predetermined position relative to said second link, and resilient means reacting between said reciprocable member and said second link to urge said reciprocable member towards said predetermined position relative to said second link, said first link being freely swingable on said lever to permit movement of said lifting arm by pivotal movement of said actuating arm independently of movement of said lever, and by adjustment of said lever independently of pivotal movement of said actuating arm.

12. In an agricultural machine, a traveling support, an actuating arm pivoted on said support, a hand lever pivotally mounted on said support for adjustment to different positions, a first link having relatively spaced pivot centers, one fixed on said lever at a distance from the pivot axis thereof substantially equal to the spacing between said pivot centers, a second link connecting said actuating arm with the other pivot center of said first link, an implement lifting arm pivotally movable on said support in implement raising and lowering directions independently of movement of said actuating arm, a reciprocable member pivotally connected at one end to said lifting arm and pivotally and slidably connected at its other end to said second link, means for preventing sliding movement of said reciprocable member, by implement lowering movement of said lifting arm, beyond a predetermined position relative to said second link, resilient means biasing said pivotal and slidable connection between said reciprocable member and said second link, adapted to urge said reciprocable member towards said predetermined position relative to said second link, and means connected with said actuating arm operable to move the latter into and out of a predetermined position in which the center of the pivotal connection between said first and second links substantially coincides with the pivot axis of said hand lever, said resilient means being effective to assist movement of said actuating arm towards said predetermined position of the latter.

13. In an agricultural machine, a traveling support, an actuating arm pivoted on said support, a first implement unit connected with said actuating arm for movement thereby from a lowered to a raised position and tending, by its weight, to move said actuating arm towards an implement lowered position, actuating means for moving said actuating arm from said implement lowered to an implement raised position, a lifting arm pivoted on said support, a second implement unit connected with said lifting arm for movement thereby from a lowered to a raised position and tending, by its weight, to move said lifting arm towards an implement lowered position, means comprising a toggle mechanism and a lost motion connection between said arms for moving both of said arms, by operation of said actuating means, from their implement lowered to implement raised positions, and permitting movement of said lifting arm from its implement lowered position towards its implement raised position independently of said actuating arm, and resilient means operatively connected with said arms so as to assume a progressively strained condition by movement of said arms due to gravitational movement of said first and second implement units from their raised to their lowered positions, said strained condition of said resilient means being effective to assist said actuating means in raising said implements, and said toggle mechanism being effective to hold said actuating arm in its implement lowered position against an increase of said strained condition of said resilient means due to said independent movement of said lifting arm.

14. In an agricultural machine, a tractor, a ground working implement, a draft connection between said tractor and implement vertically swingable on said tractor and effective to exert a lifting force upon said implement proportional to the draft transmitted from said tractor to said implement through said connection, said implement and draft connection being constructed, mounted and arranged so that in normal operation of the machine said lifting force will be insufficient to raise said implement from a predetermined ground working position but that said implement will tend to rise under the action of said lifting force when said draft increases in order to draw said implement through a hard spot or local rise of the ground; mechanism for raising and lowering said implement including an actuating element having a lost motion connection with said implement, and resilient means connected with said actuating element and implement so as to assume a progressively strained condition by lowering movement of said implement and in said strained condition counteract said rising tendency of the latter.

15. An implement adjusting mechanism for agricultural machines, comprising an implement lifting arm and an actuating arm movable from implement lowered to implement raised positions, and vice versa, about relatively spaced pivot centers on the machine, a first reciprocable link pivotally connected with said lifting arm, a second reciprocable link pivotally connected with said first reciprocable link and swingably connected with said actuating arm, a guide link having a pivot center on the machine and a pivotal connection with said second reciprocable link, whereby said implement lifting arm will be moved from its implement lowered to its implement raised position and said reciprocable links will be angularly displaced relative to each other in one direction by movement of said actuating arm from its implement lowered to its implement raised position, and resilient means connected to said reciprocable links at points thereof spaced substantial distances, respectively, from said pivotal connection between said reciprocable links, adapted to angularly displace said reciprocable links relative to each other in said one direction and thereby exert a force upon said arms tending to move the latter from their implement lowered to their implement raised positions.

16. An implement adjusting mechanism for agricultural machines, comprising an implement lifting arm and an actuating arm movable from implement lowered to implement raised positions, and vice versa, about relatively spaced pivot centers on the machine, a first reciprocable link pivotally connected with said lifting arm, a second reciprocable link pivotally connected with said first reciprocable link and swingably connected with said actuating arm, a guide link having a pivot center on the machine and a pivotal connection with said second reciprocable link, whereby said implement lifting arm will be moved from its implement lowered to its implement raised position and said reciprocable links will be angularly displaced relative to each other in one direction by movement of said actuating arm from its implement lowered to its implement raised position, and resilient means connected to said reciprocable links at points thereof spaced substantial distances, respectively, from said pivotal connection between said reciprocable links, adapted to angularly displace said reciprocable links relative to each other in said one direction and thereby exert a force upon said arms tending to move the latter from their implement lowered to their implement raised positions, said pivot center of said guide link being so located on the machine that in the implement lowered position of said actuating arm said guide link will occupy a toggle position relative to said first reciprocable link, affording a relatively small lever ratio between said lifting arm and said guide link, and a relatively large lever ratio between said actuating arm and said guide link.

WALTER G. CHARLEY.
AUGUST G. BUHR.